United States Patent
Ichikawa et al.

(10) Patent No.: US 7,905,018 B2
(45) Date of Patent: Mar. 15, 2011

(54) PRODUCTION METHOD FOR SINTERED GEAR

(75) Inventors: Junichi Ichikawa, Matsudo (JP);
Tomoyuki Kohida, Matsudo (JP);
Kensuke Nakata, Matsudo (JP);
Tomoaki Arakawa, Matsudo (JP)

(73) Assignee: Hitachi Powdered Metals Co., Ltd., Matsudo-shi (JP)

( * ) Notice: Subject to any disclaimer, the term of this patent is extended or adjusted under 35 U.S.C. 154(b) by 744 days.

(21) Appl. No.: 11/727,330

(22) Filed: Mar. 26, 2007

(65) Prior Publication Data
US 2007/0283778 A1 Dec. 13, 2007

(30) Foreign Application Priority Data

Mar. 29, 2006 (JP) .................. 2006-091950
May 29, 2006 (JP) .................. 2006-147826

(51) Int. Cl.
*F16H 55/06* (2006.01)
(52) U.S. Cl. .................. 29/893.34; 29/893.3; 29/893.36
(58) Field of Classification Search ............ 29/893, 29/893.3, 893.34, 893.36
See application file for complete search history.

(56) References Cited

U.S. PATENT DOCUMENTS

| | | | |
|---|---|---|---|
| 4,666,665 A | 5/1987 | Hornsby et al. | |
| 5,453,242 A | 9/1995 | Knoess | |
| 5,540,883 A | 7/1996 | Jones et al. | |
| 6,012,350 A * | 1/2000 | Mizuta et al. | 74/434 |
| 2003/0215349 A1 | 11/2003 | Nakamura et al. | |

FOREIGN PATENT DOCUMENTS

| | | |
|---|---|---|
| DE | 19815860 A1 | 10/1998 |
| EP | 0 097 027 A2 | 12/1983 |
| EP | 0 565 160 A1 | 10/1993 |
| EP | 0 826 449 A1 | 3/1998 |
| JP | B 48-33137 | 10/1973 |
| JP | A 2003-253372 | 9/2003 |

OTHER PUBLICATIONS

Gerhard; Neue Verfahren zur Tragfähigkeitssteigerung von gesinterten Zahnrädern (Doktorarbeit); Jun. 23, 2003; XP0012476656.

* cited by examiner

*Primary Examiner* — David P Bryant
*Assistant Examiner* — Christopher Besler
(74) *Attorney, Agent, or Firm* — Oliff & Berridge, PLC

(57) ABSTRACT

A sintered gear comprises: plural tooth portion having a tooth flank and a tooth bottom land; a high density area formed over entire surface of the tooth portion, the high density area having a density of 7.6 $Mg/m^3$ or more and formed with a depth of 1 mm or more from the surface; a low density area formed in deeper than the high density area, the low density area having a density of 7.3 $Mg/m^3$ or less; and an intermediate area formed between the high density area and the low density area, the intermediate area having a density gradient in which the density is gradually decreased from the high density area to the low density area.

4 Claims, 11 Drawing Sheets

PRODUCTION METHOD FOR SINTERED GEAR

BACKGROUND OF THE INVENTION

1. Field of the Invention

The present invention relates to sprockets and gears made from sintered metals which are produced by powder metallurgy and production method for the same, and specifically relates to improvements for wear resistance.

2. Description of the Related Art

This kind of sintered gears are largely made from Fe-based alloys, which have densities of about 6.8 to 7.2 Mg/m³ after compacting a powder and sintering the compact. In sprockets and heavy duty gears, wear resistance of a tooth flank is greatly required. In order to meet the requirement, it is effective to heighten density of sintered alloys. In order to enhance the density of Fe-based sintered alloys, hot forging may be effective. Although hot forging may allow producing gears with high density in which there are approximately no pores, the gears may have superfluous quality when the gears are not required to have entirely high density. Furthermore, weight of the gears is increased and advantages of porous body such as damping capacity and oil impregnation may be lost. Hot forging requires an apparatus to compress a work at high temperature and a specific means to avoid from oxidizing of the work while it is heated. Therefore, hot forging is complicated and the production cost is high.

Japan Patent Unexamined Publication No. 2003-253372 proposes cold forging to sintered bodies for another method to enhance the density. In the method of the reference, an Fe-based metal powder produced by partially diffusing 1 mass % of Mo particles to an iron powder containing 0.15 mass % of Mn and 0.3 mass % of a graphite powder are mixed, and the mixed powder is compacted to have a density less than 7.3 Mg/m³. The compact is sintered at a temperature of 950 to 1300° C., and is then forged in a closed or sealed die. In this method, forged parts with densities of 7.35 to 7.45 Mg/m³ when the forging pressure was 784 MPa is yielded, and forged parts with densities of 7.52 to 7.65 Mg/m³ when the forging pressure was 1177 MPa is yielded.

Japan Patent Publication No. 48-33137 proposes rolled gears for another method to enhance the density of sintered gears. In rolling of sintered bodies, inner pores are not changed after rolling, and only the surface layer of the tooth flank is rolled and densified, whereby pitching wear resistance is improved and gear accuracy is improved in the sintered gears.

The cold forging proposed in Japan Patent Unexamined Publication No. 2003-253372 has an advantage in which gears are densified by forging at room temperature. However, since a tablet-shaped sintered body is compressed and outwardly expanded in a die, thereby closely contacting the body with the die so as to form a tooth profile, high compression pressure is required. Therefore, the density of the end portion of the tooth is readily lowered when the tooth length is long. Furthermore, the weights of the sintered bodies are not uniform and there may be cases in which the weight exceeds the predetermined value. Therefore, when the sintered body is compressed to have the true density, there may be cases in which the volume after compression exceeds the predetermined value which is identical to the volume of the cavity of the die, whereby the die is broken. In order to avoid such an accident, compression may be performed using a die in which the excess volume of the material flows out the die and forms a flange as similarly as in the case of hot forging. In this case, a process for removing the flange is required and the number of processes is increased.

On the other hand, the rolling to sintered gears proposed in Japan Patent Publication No. 48-33137 has advantages in which the a tooth flank and a tooth bottom land are densified and high size accuracy can be obtained, and wear resistance can be improved. However, the method has a disadvantage in which the rolling needs long time. Furthermore, in gears with short module, rolling amount is not sufficient, whereby uniform densification is difficult. Moreover, the method is not suitable for densification of a tooth portion (entire tooth portion) and a shaft hole portion.

In order to solve the above problems, a method for forming a sintered gear was proposed. As shown in FIGS. 14 to 16, the thickness of a tooth portion is set shorter than other portion, and only the tooth portion is compressed and densified in the thickness direction in a recompression process. This method is similar to the above mentioned cold rolling, and has advantages in which since only the tooth portion is compressed, the pressure of a punch is reduced and the load exerted to a die is reduced. FIGS. 14A and 14B are a side view and a sectional view of a sprocket 231 to be produced. As shown in FIG. 15, in order to densify the tooth portion 235 of the sprocket 231, a sintered body 241 has a tooth forming portion 245 corresponding to the tooth portion 234, and an excess wall portion 245a has been formed at both ends of the tooth forming portion 245 in the thickness direction thereof. The tooth flank and the inner surface 242a of the shaft hole 242 are closely surrounded by a die 251 and a core rod 252. As shown in FIG. 16A, the excess wall portion 245a is compressed by an upper punch 253 and a lower punch 254. As a result, as shown in FIGS. 16B and 16C, the excess wall portion 245a is crushed and the tooth forming portion 245 is compressed, whereby the tooth portion 235 is densified.

However, in this method, as shown in FIG. 16C, not only the excess wall portion 245a is crushed to the compression direction (direction taken by allow A), but also the material is press out by plastic flow inwardly in the radial direction (direction taken by allow A'). As a result, although the material is compressed in the thickness direction, the material is flowed out inwardly in the radial direction, and there is a limit to densify the tooth portion 235. FIG. 16D shows an example of a density distribution of the sprocket 231 of which tooth portion 235 has been densified by this method. As shown in FIG. 16D, the density is gradually decreased from the densified tooth portion 235 to the inner circumferential portion 233 without the tooth portion 235 in a large area. This shows that amount of material flowed out from the tooth portion 235 to the inner circumferential portion 233 by plastic flow is large.

SUMMARY OF THE INVENTION

An object of the present invention is to provide a sintered gear and a production method therefor having several advantages even though conventional materials such as quenched chromium-molybdenum alloy steels for machine structural use are used. That is, in the present invention, compactibility of a powder is improved, the sintered body is easily deformed by plastic working, and hardenability is improved. Although the entire density is as low as possible and the weight is lighted, necessary portions have high density and sufficient strength and wear resistance, and rigidity and durability are totally high. Moreover, in the present invention, mass production efficiency is improved.

Another object of the present invention is to provide a production method of a sintered gear, in which in compressing and forming a sintered gear having a high density area and a low density area, flow out of the material from the high density area to the low density area can be inhibited, thereby sufficiently densifying the high density area. Specifically, the invention provides a method in which the high density area and the low density area are distinctively formed.

The present invention provides a sintered gear comprising plural tooth portion having a tooth flank and a tooth bottom land, a high density area formed over entire surface of the tooth portion, a low density area formed in deeper area than the high density area, and an intermediate area formed between the high density area and the low density area. The high density area has a density of 7.6 Mg/m$^3$ or more and is formed with a, depth of 1 mm or more from the surface. The low density area has a density of 7.3 Mg/m$^3$ or less. The intermediate area has a density gradient in which the density is gradually decreased from the high density area to the low density area.

In the sintered gear of the present invention, the high density area is formed over entire surface of the tooth portion composed of the tooth flank and the tooth bottom land, but other portion does not have high density. That is, although the entire density is low, since the tooth flank and the tooth bottom land which are required to be high strength and high wear resistance have high density, the sintered gear of the invention has high rigidity and high fatigue strength, and has high wear resistance.

The present invention includes a hole penetrating the gear in a thickness direction thereof. The hole includes a shaft hole formed at the center of the gear and a hole into which a bolt is inserted and which is formed remote from the center. In the present invention, a high density area is formed over inner surface of the hole, the high density area has a density of 7.6 Mg/m$^3$ or more and formed with a depth of 1 mm or more from the inner surface of the hole.

The sintered gear of the invention may contain 0.5 to 2.0 mass % of Mo, and may have a metallic structure in which at least the tooth portion and the vicinity thereof are quenched structure. Furthermore, the tooth flank may have no pore.

The present invention provides a production method for a sintered gear, the method comprising the following steps of:

(1) a law powder preparing step for preparing a mixed powder comprising an iron-molybdenum alloy powder in which molybdenum particles are partially diffused and bonded on a surface of an iron powder and a graphite powder;

(2) a compacting step for compressing the mixed powder in a die and forming a compact comprising:

plural tooth portions having a tooth flank and a tooth bottom land; a high density area formed over entire surface of the tooth portion, the high density area formed with a depth of 1 mm or more from the surface and formed with a recompressing thickness in a thickness direction thereof;

a low density area formed in deeper area than the high density area, the low density area having a lower density than that of the high density area; and an intermediate area formed between the high density area and the low density area;

the compact having a shape similar or homothetic to a finished shape of the gear;

(3) a sintering step for heating the compact to obtain a sintered body at a temperature of 1000 to 1200° C. in a sintering furnace into which hydrogen gas or mixed gas of hydrogen gas and nitrogen gas is provided and cooling the sintered body;

(4) a recompressing step for compressing the sintered body into a recompressed body having a predetermined shape and size in a die, thereby the high density area having a density of 7.6 Mg/m$^3$ or more, the low density area having a density of 7.3 Mg/m$^3$ or less, and the intermediate area having a density gradient in which the density is gradually decreased from the high density area to the low density area;

(5) a heat treatment step for heating the recompressed body at a temperature range of 850 to 950° C. for a predetermined time, and quenching the recompressed body from the temperature range, and tempering the recompressed body.

In the production method of the present invention, a hole penetrating the compact in a thickness direction thereof may be formed in a compact forming step, and an inner surface of the hole may be provided with a high density area which is densified within a depth of 1 mm or more from the inner surface and provided with a recompressing thickness. The present invention includes a hole penetrating the gear in a thickness direction thereof. The hole includes a shaft hole formed at the center of the gear and a hole into which a bolt is inserted and which is formed remote from the center.

In the present the iron-molybdenum powder in the mixed powder used in the law powder preparing step may contain 0.5 to 2.0 mass % of Mo, and the content of the graphite powder may be 0.1 to 0.4 mass %. When the high density area in the compact formed in the compacting step has a density of 6.8 to 7.4 Mg/m$^3$ or more, and low density area in the compact has a density of 6.6 to 7.2 Mg/m$^3$ or less, the densities of the high density area and the low density area after sintering of the sintered gear can be required densities. The high density area of the compact and the high density area of the recompressed body are preferably formed in homothetic shapes. The recompressed body compressed in the recompressing step or the heat treated body subjected to the heat treatment step is subjected to sizing, whereby at least pores in the tooth flank are preferably disappeared.

The present invention provides a sintered gear in which the entire density is low, but the tooth flank is hide density. In the sintered gear, the rigidity and the fatigue strength are high, and the wear resistance is high. Therefore, the sintered gear can be applied to techniques in which high pressure is loaded to the tooth flank, and utility of the sintered gear can be widened.

In the present invention, ordinary steps such as a compacting step using a die, a sintering step, a recompressing step using a die, and a heat treatment step are used as well as a production method for ordinary sintered products, whereby mass production efficiency can be improved. In the present invention, since the sintered body includes low density area, when the sintered body is recompressed and the tooth portion is compressed to a predetermined size so as to have true density, plastic flow goes ahead from the portion of the true density to the portion of the low density. Therefore, excess pressure in the recompressing can be avoided, whereby the die is not required to have a structure to form a flange for the excess volume of the material. That is, since ununiform of weight of the sintered bodies can be absorbed, the sintered gear can be economically mass produced.

Next, the present invention further provides a production method for sintered gear comprising, a high density area, a low density area having a lower density than that of the high density area, and a step portion connecting the high density area and the low density area. The method comprises a preparing step for preparing a sintered body for compressing. The sintered body comprises a high density forming portion which forms the high density area by being compressed and having excess wall portions formed at both ends of the high density area in a compressing direction. The sintered body comprises a low density forming portion which forms the low density area by being compressed and disposed at a position biased from the high density forming portion toward one direction along the compressing direction. The sintered body also comprises a step forming portion which forms the step portion by being compressed and connecting the high density forming portion and the low density forming portion. The step forming portion has an excess wall portion of which thickness gradually increases from the low density forming portion to the high density forming portion, the excess wall portion is disposed at an opposite side of the above one direction. The method further comprises a compressing step for compressing the high density forming portion in a direction perpendicular to a direction along which the high density area and the low density area are arranged in a condition in which an outer circumferential surface of the sintered body is closely surrounded by a die, thereby crushing the excess wall portions of the high density forming portion and forming the high density area, and compressing at least the excess wall portion of the step forming portion, thereby crushing the excess wall portion and forming the step portion between the high density area and the low density area.

For example, when a sprocket shown in FIG. 14 is produced, the tooth portion is the high density area and the inner portion disposed inside the tooth portion, and the step portion is formed therebetween. In this case, when the high density forming portion of the sintered body is compressed in the thickness direction and the excess wall portion is crushed, as shown in FIG. 16C as a conventional art, the material in the tooth portion flows out to the inner direction, namely, toward the low density area. In the case of the invention, the material flows out toward the step forming portion which is opposite to the side closely surrounded by the die.

In contrast, in the present invention, the excess wall portion of the step forming portion is disposed at one side which is the opposite side of the direction (one direction along the compressing direction) in which the low density forming portion is biased from the high density forming portion. When the excess wall portion of the step portion is compressed in the recompressing step, a part of the material plastically flows toward the high density forming portion according to the shape of the step portion in addition to the material which plastically flows toward the compressing direction. That is, in the step forming portion, the part of the material moves counter to the material flowing out from the high density forming portion to the step forming portion. The flow out of the material from the high density forming portion to the low density forming portion is inhibited by the counter movement of the part of the material. As a result, the densification in the high density forming portion is increased, whereby the high density area after compressing is effectively densified.

In the conventional method shown in FIGS. 16A to 16D, if the thickness of the excess wall portion of the tooth portion is large, the densification is enhanced and the tooth portion has high density although the material flows out to radially inner portion. However, such a method results in increase of load exerted to the die, whereby burden for the apparatus such as large design of die and large compressing capacity will be increased.

In contrast, in the present invention, the step forming portion is provided to the sintered body and the excess wall portion is provided to the step forming portion, and the flow out of the material from the high density forming potion to the step forming portion is inhibited. Therefore, the high density area can be highly densified without large compressing capacity, whereby burden of production such as large design of die can be reduced.

In the present invention, the high density area has a thickness h1 in the compressing direction and the step portion has a level distance h2 between the high density area and the low density area, and h2/h1 is preferably ¼ or more.

As examples of the cross sectional shape of the step forming portion after compacting, a linear shape and an arc shape are mentioned. When the linear shape is applied, the step portion is preferable inclined with respect to the high density area with an angle of 10 to 90 degrees.

In the another production method of the present invention, the sintered body is formed such that the flow out of the material in the high density area in compressing the high density area is inhibited, whereby the high density area after compressing is effective densified, and a sintered gear in which the high density area and the low density area are distinctively formed can be easily produced.

DETAILED DESCRIPTION FOR THE INVENTION

Figure 1A:
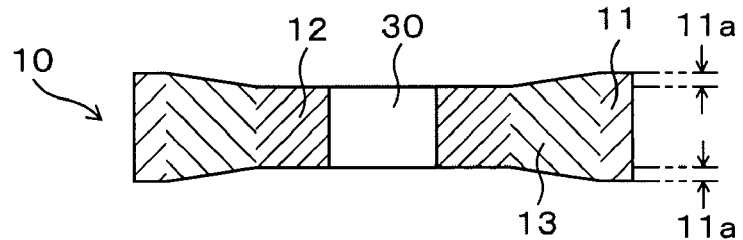
FIG. 1A is a cross sectional view showing a sintered body according to the first embodiment of the invention and FIG. 1B is a cross sectional view showing a recompressed body of the sintered body.

An embodiment of the present invention will be explained referring to drawings hereinafter.
1. Composition of Sintered Alloy In selection of composition of a sintered gear, it may be principle that compactibility of a powder is good in production, a sintered body has ductility and is good in plastic deformation and quenchability, and amount and kind of alloying elements are small. As an alloy fulfill the requirements, hypoeutectoid steel containing 0.5 to 2.0 mass % of Mo, 0.1 mass % or more of C, and Fe as a main element is preferable.

Mo: In these components, Mo is an element for improving quenchability. Other alloying elements may not be added to maintain ductility of a sintered body. Several kinds of alloying elements increase strength of a sintered body but decrease ductility. Mo is an element which does not decrease ductility so much. When amount of Mo is small, ductility of a sintered body is good. However, amount of Mo is less than 0.5 mass %, quenchability is not sufficient and there is a case in which hardness after heat treatment is insufficient when weight of a sintered gear is large. When amount of Mo is large, quenchability of a sintered body is improved. However, even if amount of Mo is more than 2 mass %, quenchability is not so improved comparing to amount of Mo, thereby increasing the production cost. Therefore, amount of Mo is set in a range from 0.5 to 2 mass %. Amount of Mo is preferably about 1 mass % to obtain ductility required in recompressing and quenchability required to yield hard gears.

C: Amount of C contained in a sintered body is set in a hypoeutectoid range as well as ordinary steel material, and is in a range from 0.1 to 0.4 mass %. When amount of C bonded in a matrix is large, strength is high and ductility is low. Therefore, plastic deformation in recompressing is obstructed and pressure required in compressing is increased. When the sintered body is subjected to carburizing quenching, amount of C varies between the surface portion and the center portion of a gear. When the sintered body does not contain C, C may not reach the center of the gear in carburizing. Therefore, amount of C is preferably 0.1 mass % or more.

2. Low Powder for Production of Sintered Alloy

In order to add Mo, partially Mo alloyed iron powder in which Mo particles are partially alloyed and bonded to a particle surface of atomized iron powder having good compactibility may be used. The reason of using such a powder is that an iron alloy powder in which Mo is solid-solved does not have good compactibility. Mo is diffused in an iron matrix in sintering and in a heat treatment in order and finally forms a sintered alloy having improved quenchability. Partially Mo alloyed iron powder is produced by mixing predetermined amount of a molybdenum oxide powder to an atomized iron powder, heating the mixed powder in hydrogen gas to reduce the molybdenum oxide, and crushing the powder. C is generally added in a graphite powder. In order to obtain a sintered body having a hypoeutectoid composition, amount of the graphite powder is in a range of 0.1 to 0.4 mass %. A lubricant for compacting can be added. When a lubricant is not added, an inner surface of a die for compacting should be coated with a lubricant by an electrostatic coating apparatus to reduce friction between the die and a compact. When a lubricant is added to a mixed powder, amount of the lubricant is 0.75 mass % or less. If amount of the lubricant is large, it is difficult to obtain a compact with high density. When a die is not lubricated, the lubricant is preferably added in a range of 0.2 to 0.7 mass % in consideration with die releasing and compactibility of a mixed powder.

3. Compacting Powder

A powder compacting die is used for compacting a powder in the same way as compacting ordinary sintered gears. The profile of a compact is approximately the same as a finished shape of a sintered gear, and the compact has a shape similar or homothetic to the finished shape of the gear. Difference between these shapes is that the compact has a high density area having a higher density than other portion. The high density area is formed with a depth of 1 mm or more from surfaces of a tooth flank and a tooth bottom land, and optionally a high density area is formed with a depth of 0.1 mm or more from surfaces of a shaft hole and bolt holes of the gear. Another difference is that the compact has a thickness added with a recompressing thickness for recompressing a sintered body after sintering.

When the density of the portion which is recompressed in a sintered body is high, the portion can be densified with a small recompressing thickness and the density of other portion can be low. The density of the high density area is in a range of 6.8 to 7.4 Mg/m$^3$, and the density of other low density area is in a range of 6.6 to 7.2 Mg/m$^3$. Although the high density area preferably has high density so as to easily densify by recompressing, if the density of the high density area is more than 7.4 Mg/m$^3$, the pressure for compacting is required to be large. The density of the low density area is 6.6 Mg/m$^3$ or more so as to obtain mechanical strength required to a gear member, and is 7.2 Mg/m$^3$ or less so as to have difference from the density of the recompressed high density area.

A large load is exerted to a tooth flank and a tooth bottom land of a gear when gears engage each other. Therefore, when the depth of the high density area in the compact, namely, the distance from the surface of the thick portion to which the recompressing thickness is provided, is less than 1 mm, and the thick portion of a sintered body is recompressed, the recompressed material flows to the low density area, whereby the tooth flank may not be densified. The tooth flank can surely be densified by maintaining the volume to be recompressed in the vicinity of a tooth flank. Therefore, the depth from the surface of the recompressing thick portion is required to be 1 mm or more. On the other hand, a shaft hole and a bolt hole in a gear are not exerted with a so large load as in the tooth flank and the tooth bottom land. Therefore, it is sufficient that the depth from the surface of the recompressing thick portion is 0.1 mm or more. The maximum depth from the surface of the thick portion is decided according to the diameter and the module of the gear, but is preferably 5 mm or less. If the maximum depth is too large, the recompressing pressure is increased, and the volume of the low density area is decreased and the weight of the gear is increased.

Figure 1B:
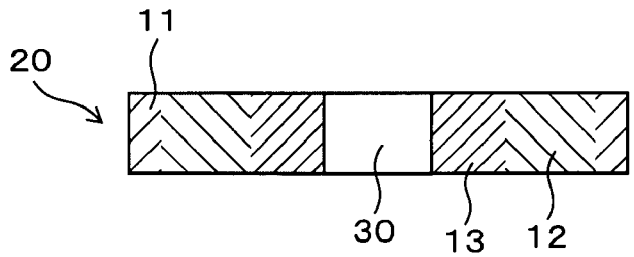

In a case of a sintered gear with a uniform thickness, the thickness of a compact and a sintered body obtained by sintering the compact is designed such that the thickness of a tooth portion is large, and the thickness of the portion adjacent to the tooth portion is gradually reduced toward the center of the gear. FIGS. 1A and 1B show cross sectional views of an embodiment of a spur gear. FIG. 1A shows a sintered body 10 obtained by sintering a compact, and FIG. 1B shows a recompressed body 20 obtained by recompressing the sintered body 10. The sintered body 10 has a uniform density at this time and a recompressing thickness 11a which expands toward the thickness direction at both sides of a high density area 11, thereby increasing the thickness. A low density portion 12 is formed around the center shaft hole 30 and has small thickness. An intermediate area 13 is formed between the high density area 11 and the low density area 12. The sintered body 10 is recompressed in the thickness direction, whereby a recompressed body 20 having a uniform thickness is obtained. In this condition, the density of the high density area 11 is high and the density of the low density area is low, and the intermediate area 13 has a density gradient in which the density is gradually decreased from the high density area 11 to the low density area 12.

Figure 2A:
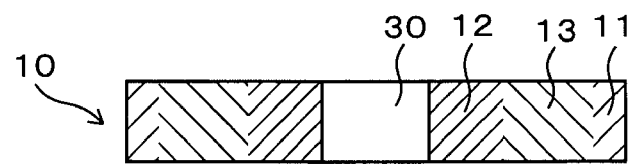
FIG. 2A is a cross sectional view showing another sintered body according to the first embodiment of the invention and FIG. 2B is a cross sectional view showing a recompressed body of the sintered body.
Figure 2B:
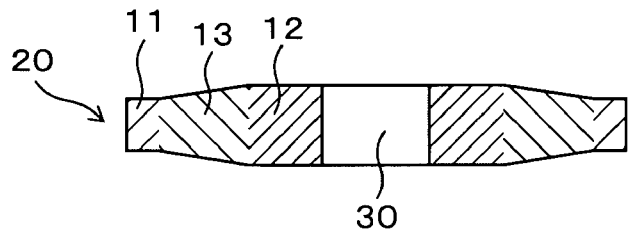

In a case in which the thickness of a tooth portion smaller than that of other portion, the thickness of a compact and a sintered body obtained by sintering the compact can be uniform. FIGS. 2A and 2B show cross sectional views of an example of such a spur gear. FIG. 2A shows a sintered body 10 obtained by sintering a compact, and FIG. 2B shows a recompressed body 20 obtained by recompressing the sintered body 10. As shown in FIG. 2A, the sintered body 10 has a uniform thickness and consists of a high density area 11, an intermediate area 13, and a low density area in order from the outer circumference to the inner circumference, but the density thereof is uniform at this time. Recompressing of the sintered body 10 in the thickness direction is performed with respect to the high density area 11 and the intermediate area 13. As a result, as shown in FIG. 2B, the high density area 11 is thin and both side surfaces of the intermediate area 13 are inclined toward the low density area 12.

Figure 3A:
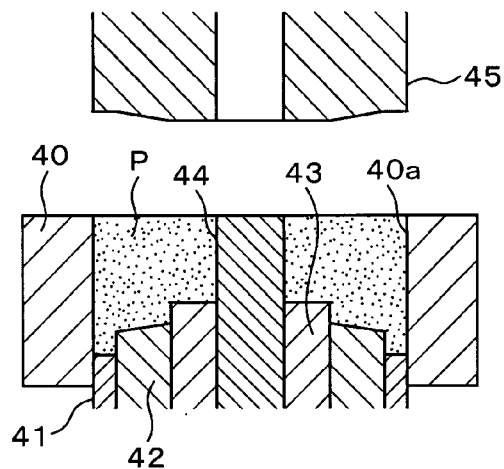
FIGS. 3A and 3B are a cross sectional views showing a compacting step in order according to the first embodiment of the invention.
Figure 3B:
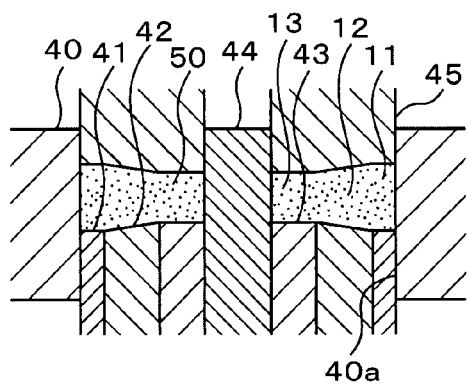

FIGS. 3A and 3B are cross sectional views showing specific compacting method in which the density is varied in a compact. FIGS. 3A and 3B show a die set for compacting a compact having the same shape as the sintered body 10 shown in FIG. 1A. The die set comprises a die 40, an outer lower punch 41, an intermediate lower punch 42, and an inner lower punch 43 which are cylindrical and slidably closely fitted into a die hole 40a of the die 40 in the vertical direction. A core rod 44 is slidably closely fitted into the inner lower punch 43. An upper punch 45 is slidably closely fitted into the die hole 40a of the die 40. The core rod 44 is slidably closely fitted into the upper punch 45.

The upper end surface of the core rod 44 is coincide with or higher than the upper end surface of the die 40. The punching surface (upper end surface) of the outer lower punch 41 is disposed at the lowest position, the punching surface of the inner lower punch 43 is disposed at the highest position, and the punching surface of the intermediate lower punch 42 is disposed at the intermediate position of these punching surfaces. A raw powder P is filled in a cavity formed by the punching surfaces of the low punches 41, 42, 43, and the die hole 40a. It should be noted that the punching surface of the intermediate lower punch 42 is downwardly inclined toward outer circumference. The punching surface (lower surface) of the upper punch 45 comprises an inner flat surface which is perpendicular to the axis and disposed around a hole into which the core rod 44 is inserted. An inclined surface upwardly inclined toward outer circumference is formed at outside of the inner flat surface, and an outer flat surface perpendicular to the axis is formed at outside of the inclined surface.

Then, the upper punch 45 is moved downward and inserted into the die hole 40a, and the lower punches 41, 42, and 43 are moved upward, thereby compressing the raw powder P as shown in FIG. 3B. The lower punches 41, 42, and 43 are moved so that the punching surfaces smoothly continue. That is, amount of the movement of the intermediate lower punch 42 is larger than that of the inner lower punch 43, and amount of the movement of the outer lower punch 41 is larger than that of the intermediate lower punch 42. In the compact 50 thus formed, the portion compressed by the outer lower punch 41 with deep powder filling is the high density area 11, the portion compressed by the inner lower punch 43 with shallow powder filling is the low density area 13, and the portion between these portions is the intermediate portion 12 in which the density is gradually reduced from the high density area 11 to the low density area 13 and both side surfaces are inclined.

It should be noted that if portions around the shaft hole and the bolt hole are required to be densified, a recompressing thickness is provided to these portions and densified. The shape of the high density area in the compact is preferably designed such that the shape is homothetic viewed from the compressing direction. The shape is homothetic in ordinary spur gears. In gears having a non-homothetic shape such as a non-circular gears and sector gears, an offset load is exerted to a punch in compacting and recompressing. Therefore, the width of the high density area is preferably adjusted so as to make uniform the recompressed surface in the circumferential direction.

3. Sintering

In sintering of a compact, the compact is maintained in a sintering furnace into which hydrogen gas or a mixed gas of hydrogen gas and nitrogen gas is provided at a temperature range from 1000 to 1200° C., preferably from 1100 to 1150° C., then, the compact is cooled. Mo and C are diffused into an iron matrix in the sintering, whereby strength and ductility are improved. The heating time is set at a suitable range in consideration with the strength and the ductility of the sintered body obtained by sintering at the above temperature range. For example, when the sintering temperature is 1150° C., the sintering time is about 30 minutes. In order to improve ductility, the cooling rate may be as slow as possible. Content of carbon in a sintered body is 0.6 mass % or less, and is preferably 0.1 to 0.4 mass % to obtain suitable strength and ductility. When content of carbon is large, ductility is decreased.

4. Forming High Density Area by Recompressing

Figure 4:
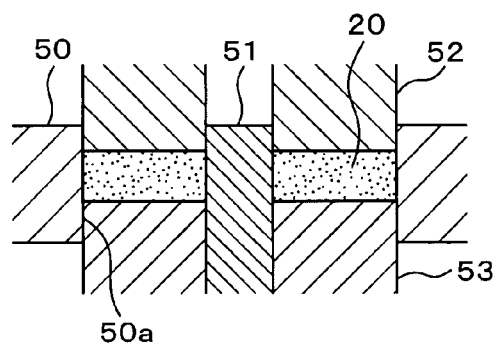
FIG. 4 is a cross sectional view showing a recompressing step according to the first embodiment of the invention.

Recompressing of a sintered body is performed using a die set similar to a sizing die set at room temperature. FIG. 4 is a cross sectional view showing a condition in which a sintered body (spur gear) is recompressed in a die set for recompressing. The die set comprises a die 50, core rod 51, and upper and lower punches 52 and 53. The recompressed body 20 is same as the recompressed body shown in FIG. 1B. In recompressing, a lubricant is coated to a surface of the sintered body or an inner surface of the die set to reduce friction between die 50 and the core rod 51, and the sintered body. When compressing thickness is large, plastic deformation will be ununiform due to friction between the surfaces of the punches 52 and 53 and the sintered body, whereby there may be a case in which a portion of the material is not closely contacted with the inner surface of the die 50. Therefore, lubrication between the surfaces of the punches and the sintered body is preferable as in a case of hot forging. Compressing speed in recompressing can be slow as in a case of hydraulic press. When compressing speed is high as in a case of mechanical press used for forging, plastic deformation is easily occurs and production efficiency is improved. Of cause, production efficiency is more improved than a case of rolling because recompressing is performed using a die.

The size of a sintered body provided to a die for recompressing is smaller than the size of the die hole 50a of the die 50. The portion for a high density area is compressed into a predetermined size and plastically deformed and densified, and is closely contacted with the inner wall of the die, thereby being formed into predetermined size and shape. In recompressing the sintered body, when the thickness of the portion to be recompressed is larger than that of other portion, the thickest portion is first compressed and the inclined surface is then compressed. When the thickness of sintered body provided with a recompressing thickness is uniform, the punching surfaces of the upper and lower punches 52 and 53 are partially projected to each other in the vicinity of the tooth portion in a length equal to the recompressing thickness. For this structure of punches 52 and 53, the gear is finished to a shape in which the tooth portion is thinner than other portion. When compressing is performed to only a portion to be recompressed, the compressing area can be small and compressing pressure for plastic deformation can be reduced.

Recompressing may be performed to not only the high density area and the vicinity thereof but also the low density area with small thickness. The recompressing thickness is preferably provided to both surfaces of the sintered body uniformly, but the present invention does not exclude the embodiment in which the sintered body is recompressed from only one direction (for example, from only the upper punch 52). Since the intermediate area between the high density area and the low density area has a density gradient along the radial direction, there is no clear boundary of strength and durability is improved. When the depth of the high density area from the tooth bottom land is smaller than the depth of the high density area from the tooth flank, plastic deformation of the tooth bottom land may be insufficient. Therefore, the depth of the high density area from the tooth bottom land is preferably large or the density of the portion around the tooth bottom land is preferably large.

The density of the recompressed portion is high as the density of the sintered body is high. For example, in order to obtain a recompressed density of 7.7 $Mg/m^3$, the recompressing pressure is 1800 MPa when the density of the sintered body is 6.8 $Mg/m^3$, and the recompressing pressure is 1100 MPa when the density of the sintered body is 7.4 $Mg/m^3$. Even if the recompressed high density area is required to have true density and to be further compressed to a predetermined shape, the material can plastically flow toward the low density area. Therefore, even if the weight of the sintered body is larger than the predetermined value, the die is not broken and recompressed body can be formed without flange.

5. Heat Treatment

The recompressed body is subjected to heat treatments, which include heating before quenching, quenching, and tempering. The heating before quenching is performed in a carburizing gas for carburizing the recompressed body. The followings are other objects of the heating before quenching.

In the portion in which amount of pores was reduced by recompressing, fine cracks which are closed by mechanical contact are formed, distortion is generated in particles and boundary of the particles, and grain size is decreased. Furthermore, in the portion of which large amount is plastically flowed and the portion which was plastically flowed by contact with a die, grains are finely drawn and show a structure like a metal flow in forging. Disadvantageous defects for strength and wear resistance among these phenomena may be restored by the heating before quenching. Another object of the heating is preliminary heating before quenching. The temperature of the heating before quenching is somewhat higher than the $Ac^3$ transformation point as in quenching for ordinary iron alloys, and is suitably in a range of 850 to 900° C. which is higher than recrystallization temperature.

Maintaining time in the heating before quenching is changed according to size of a recompressed body, 3 to 5 hours is preferable for the above objects. In the recompressed body to which a high density area is provided, the high density area is directly carburized, and the low density area is also easily carburized. Therefore, the recompressed body is carburized in short time compared to carburizing for alloy steels for machine structural use. The carbon content in the surface of the carburized recompressed body is in a hypoeutectoid range, 0.4 to 0.6 mass % is preferable. Generally, the heating before quenching and the quenching are continuously performed, but the present invention does not exclude such a embodiment that a recompressed body is subjected to heating before quenching so as to restore defects caused by carburizing and recompressing, then is cooled, and is subsequently heated again to a quenching temperature, and is then quenched. The quenching is generally performed in oil. Since the alloy contains large amount of Mo, the quenchability is good and the surface portion of the recompressed body can be a martensitic structure. Tempering is performed at about 180° C. for about 1 hour.

6. Other Processes (1) Sizing for Densifying Tooth Flank

Sizing for densifying tooth flank may be performed in addition to the above processes. The sizing is preferably performed to a recompressed body (sintered gear), but can be performed to a heat treated recompressed body. When the high density area of a tooth flank, and the like, is not densified to have true density, the tooth flank is subjected to sizing for densifying so that pores in the tooth flank disappear, whereby wear resistance in high surface pressure is further improved. Furthermore, dimensional accuracy of the tooth flank is improved.

Figure 5:
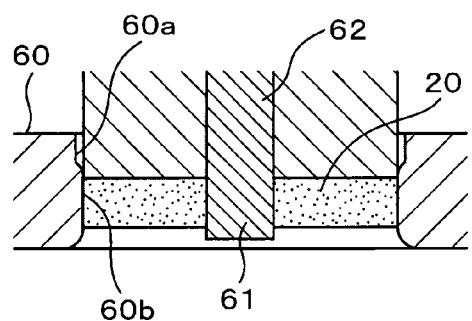
FIG. 5 is a cross sectional view showing a sizing step for densifying a tooth portion according to the first embodiment of the invention.

Sizing for densifying tooth flank is performed by extrusion sizing in which sintered gear is press inserted and penetrated through a die having a tooth profile. In this process, a lubricant for plastic work is used. FIG. 5 shows a condition in which a sintered gear (recompressed body) is subjected to sizing using a die set for surface densifying sizing. The die 60 in the die set has a tooth profile in the inner surface thereof. The inner surface of a die hole 60a has a large diameter portion at upper half thereof and a drawing portion 60b of which diameter is reduced at lower half thereof. The size of the tooth profile of the die 60 is set to be smaller than that of the recompressed body 20. A core rod 61 is inserted into the recompressed body 20 comprising a low density area, an intermediate area, and a high density area, and a punch 62 is inserted into the die hole 60a, whereby the recompressed body 20 is press inserted and penetrated through the drawing portion 60b. As a result, the tooth flank of the recompressed body 20 is intensely rubbed by the tooth flank of the die, whereby pores in the tooth flank disappear.

(2) Other Process

A sintered gear is subjected to other processes such as machining for side surfaces and threading if necessary. In addition, a sintered gear is subjected to bonderizing and oil impregnation.

7. Embodiment of Shape of Sintered Gear

Figure 6:
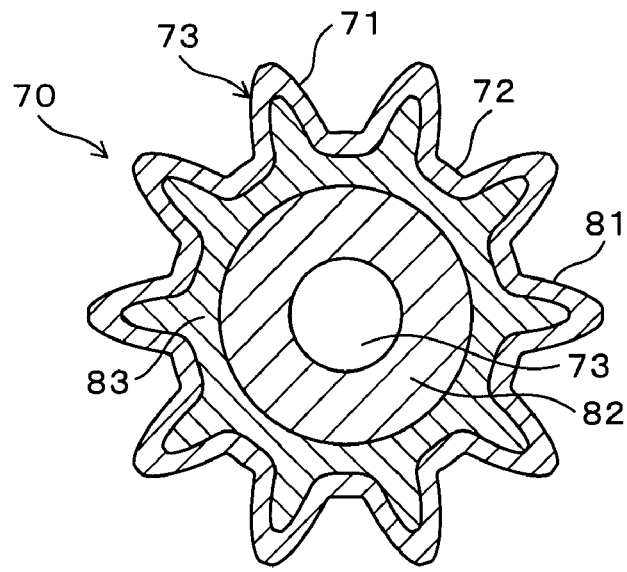
FIG. 6 is a plane cross sectional view showing a sintered gear according to the first embodiment of the invention.

FIG. 6 is a plane cross sectional view showing a density distribution of a spur gear (sintered gear) 70 having a large module. The sintered gear 70 comprises a high density area 81 with a density of 7.6 $Mg/m^3$ or more formed in an area from a tooth flank 71 and a tooth bottom land 72 to a depth of 1 mm or more, a low density area with a density of 7.3 $Mg/m^3$ or less formed in an area around a shaft hole 73 formed in the center, and an intermediate area 83 formed between the high density area 81 and the low density area 82. Although boundaries of the high density area, the intermediate area 83, and the low density area 82 are clearly shown in FIG. 6, the density is gradually changes in actual.

Since the sintered gear 70 has a somewhat large module, the shape of the inner circumference of the high density area 81 corresponds to the tooth profile. The depth of the high density area 81 is 1 mm or more from the tooth flank 71 and the tooth bottom land 72, whereby plastic deformation in recompressing sufficiently covers the tooth flank 71 and the tooth bottom land 72, the surface of the tooth portion is stably densified. Since other portion has a somewhat low density, advantages of a sintered gear having pores can be obtained. That is, the gear is light weight, oil impregnation is available, and damping capacity is obtained.

Figure 7:
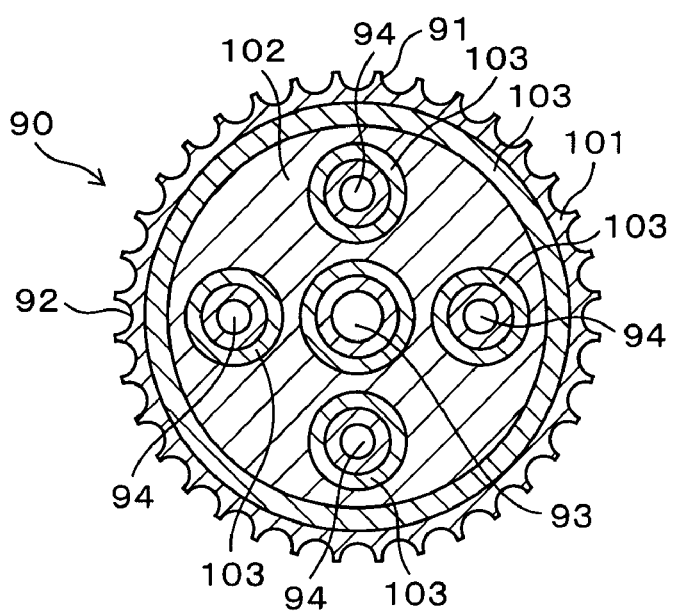
FIG. 7 is a plane cross sectional view showing another sintered gear according to the first embodiment of the invention.

FIG. 7 is a plane sectional view showing a density distribution of a sintered gear 90 having a specific shape of tooth profile. The sintered gear 90 comprises a high density area 101 with a density of 7.6 $Mg/m^3$ or more formed in an area from a tooth flank 91 and a tooth bottom land 92 to a depth of 1 mm or more, and an intermediate area 103 formed inside the high density area 101. A shaft hole 93 is formed inside the high density area 101, and plural (four in this embodiment) bolt holes 94 are formed around the shaft hole 93. A high density area 101 with a density of 7.6 $Mg/m^3$ or more is also formed around the shaft hole 93 and the bolt holes 94 in an area from the inner surfaces thereof to a depth of 0.1 mm or more. Furthermore, an intermediate area 103 is formed around the high density areas 101, and a low density area 102 is formed in other portion.

Since the sintered gear 90 has a small module, shape of the inner circumference of the outer circumferential high density area 101 is approximately a circle. In the sintered gear 90, since the high density area 101 is formed around the shaft hole 93, the gear 90 can be applied to applications required to be greatly strong. The bolt hole 94 is used to insert a bolt for mounting the sintered gear 90 to another member. Since the circumference of the bolt hole 94 is densified, the tightening strength, namely, the securing strength can be enhanced.

EXAMPLES (1) Raw Powder

An iron-molybdenum alloy powder in which molybdenum particles are partially diffused and bonded on a surface of an iron powder, 1 mass % of a graphite powder, and 0.6 mass % of ethylene-bis-stearoamide as a lubricant were mixed and a raw powder was prepared.

(2) Compacting

A compact having a shape of a spur gear was compacted using a die set similar to the die set shown in FIG. 3A. In the compact, the diameter of the tip circle was 60 mm, the number of teeth was 23, the diameter of the shaft hole was 16 mm, and the thickness and the density were set according to FIG. 1A. Specifically, a high density area with a density of 7.3 $Mg/m^3$ and a thickness of 6.36 mm was formed in the entire portion of the tooth portion and an area from the tooth bottom land toward the shaft hole at a depth of 2 mm. A low density area with a density of 6.8 $Mg/m^3$ and a thickness of 6 mm was formed in an area from inner surface of the shaft hole at a depth of 10 mm. An intermediate area was formed between the high density area and the low density area. In the intermediate area, the thickness was gradually varied from 6.36 mm to 6 mm and the density was gradually varied from 7.3 $Mg/m^3$ to 6.8 $Mg/m^3$.

(3) Sintering

The compact was sintered at a sintering furnace in which decomposed ammonia gas (mixed gas of hydrogen gas and nitrogen gas) was provided at a temperature of 1150° C. The metallographic structure in the cross section of the sintered body was a mixed structure of pearlite and ferrite.

(4) Recompressing

The sintered body was recompressed using a die set similar to the die set shown in FIG. 4. A die having a slightly larger tooth profile than that of the sintered body was used. In the recompressing, the high density area and the intermediate area were compressed to a uniform thickness, and the low density area was not compressed. The density of the high density area in the vicinity of the tooth portion was 7.7 $Mg/m^3$ and the density of the low density area was 6.8 $Mg/m^3$.

The plane cross section of the tooth portion was observed. As a result, there was a structure in which the grains were finely drawn like a metal flow in forging in the vicinity of the tooth bottom land. It was assumed that the structure was formed because the tooth bottom land of the sintered body was brought into contact with the tooth end of the die and plastically flowed. Furthermore, it was observed that the grain size in the high density area was smaller than that of the sintered body.

(5) Heat Treatment

The recompressed body was maintained at 860° C. for five hours in a carburizing gas, and was then quenched in oil. The recompressed body was tempered at 180° C. for 60 minutes. The apparent surface hardness of the high density area of the sintered gear after the heat treatment was HRC 55, and the fine hardness in the cross section was Hv 750. The structure was martensite in observation of cross sectional microscopic structure.

(6) Result of Wear Test for Gear

As a comparative example, a chromium-molybdenum alloy steel of an alloy steel for machine structural use (C: 0.2 mass %, Mn: 0.8 mass %, Cr: 1 mass %, Mo: 0.2 mass %, and the balance of Fe and inevitable impurities) was machined to have the same shape of the sintered gear of the present invention. The gear was heated at 860° C. for 5 hours, and was then quenched and tempered. The comparative gear and the gear of the invention were engaged and a load was exerted thereto, the gears were rotated at 3000 rpm for 60 hours. Then, the tooth flanks of the gears were observed to investigate pitching wear. As a result, there was no difference between the degrees of wear in both teeth flank.

The sintered gear of the present invention is applied to sprockets, rotors for oil pumps, reduction gears, belt pulley with teeth. Since the sintered gear of the present invention has wear resistance equal to an alloy steel for machine structural use, the sintered gear can be applied in stead of a gear made from the above alloy.

Figure 8A:
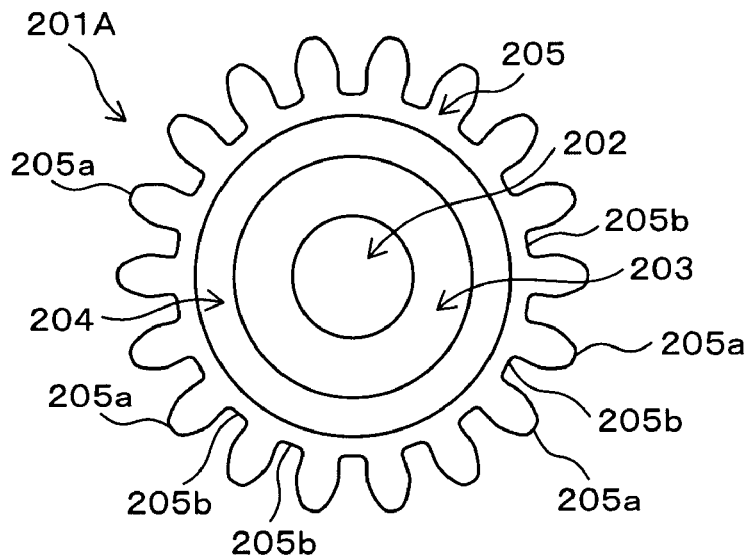
FIG. 8A is a plane view showing a sprocket according to the second embodiment of the invention and FIG. 8B is a cross sectional view showing the sprocket.
Figure 8B:
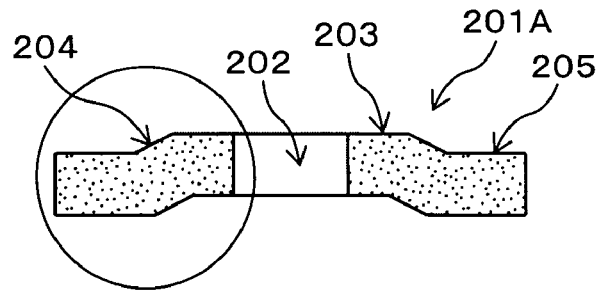

Next, an embodiment of another invention will be explained referring to FIGS. 8 to 13. FIG. 8 shows a sintered sprocket 201A produced by the embodiment of the invention. The sprocket 201A has a uniform thickness and comprises a ring-shaped inner circumferential portion (low density area) 203 formed around a shaft hole 202 into which a shaft is closely fitted and secured, a shade-shaped step portion 204 formed around the inner circumferential portion 202, and a tooth portion (high density area) 205 formed around the step portion 204. Plural teeth 205a are formed in the tooth portion 205 along the circumferential direction at the same interval, and a tooth space 205b is formed between the teeth 205a.

Figure 8C:
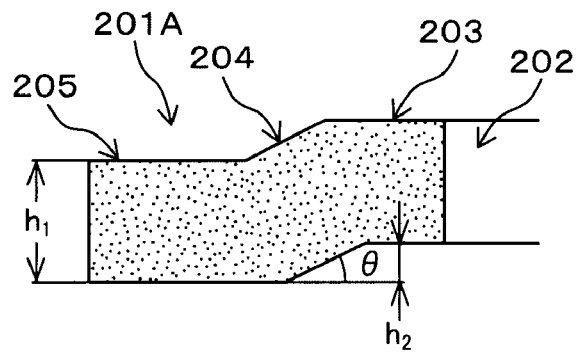
FIG. 8C is enlarged view of the sprocket.

The sprocket 201A was obtained by recompressing a sintered material consisting of a sintered body in the thickness direction. The tooth portion 205 is formed in a high density (7.6 $Mg/m^3$ or more) and the inner circumferential portion 203 is formed in a low density (about 7.2 $Mg/m^3$ or more). The inner circumferential portion 203 is disposed at a position biased from the tooth portion 205 toward one direction (upward direction in FIG. 8A) along the thickness direction because the step portion 204 is formed, and the tooth portion 205 and the inner circumferential portion are parallel each other As shown in FIG. 8C, the step portion 204 connecting the tooth portion 205 and the inner circumferential portion 203 has liner cross section, the angle θ with respect to the tooth portion 205 is 10 degrees or more and less than 90 degrees. The tooth portion 205 has a thickness h1 and the step portion 204 has a level distance h2 between the tooth portion 205 and the inner circumferential portion 203, and h2/h1 is ¼ or more. In the sprocket 201A, the radial length of the inner circumferential portion 203 is approximately the same as the radial length of the tooth portion 205, and the radial length of the step portion 204 is about half the length of the inner circumferential portion 203.

Figure 9:
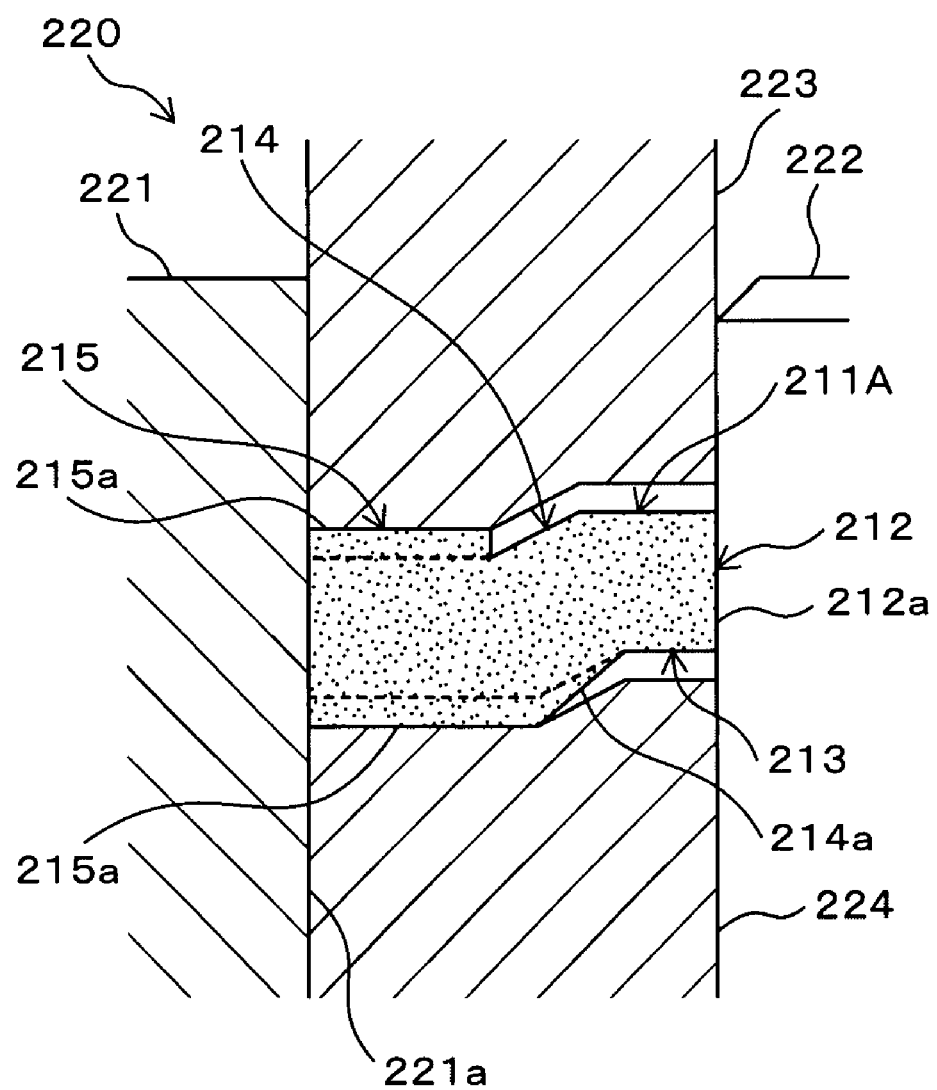
FIG. 9 is a cross sectional view showing a condition in which a sintered body is set in a die according to the second embodiment of the invention.

Then, a process for recompressing in producing the sprocket 201A will be explained hereinafter. FIG. 9 shows a prepared condition in which a sintered body 211A before recompressing to the sprocket 201A is set in a die set 220 to compress the sintered body 211A in the thickness direction. The sintered body 211A has a shape homothetic to the sprocket 201A. The sintered body 211A integrally comprises an inner circumference forming portion (low density forming portion) 213 in which a shaft hole 212 is formed in the center thereof, step forming portion 214 formed around the inner circumference forming portion 213, and a tooth forming portion (high density forming portion) 215 formed around the inner circumference forming portion 213. Plural teeth are formed in the tooth forming portion 215 along the circumferential direction at the same interval. The step forming portion 214 linearly extends inside while upwardly expanding in the thickness direction (upward direction in FIG. 9) from the inner circumference of the tooth forming portion 215. The inner circumference forming portion 213 extends inside in parallel to the tooth forming portion 215 from the inner circumference of the step forming portion 214. The inner circumference forming portion 213 is disposed at a position biased from the tooth forming portion 215 in the thickness direction because the step forming portion 214 is formed.

An excess wall portion 215a (excess wall portions of the high density forming portion, outside portion beyond the broken line in FIG. 9) having a uniform thickness for the tooth portion is formed on both surfaces of the tooth forming portion 215, namely on the upper and lower end surfaces in FIG. 9, whereby the tooth forming portion 215 is formed in thicker than other portion. An excess wall portion 214a for step portion is formed on the lower surface of the step forming portion 214. That is, the excess wall portion 214a is provided on the opposite side of the direction in which the step forming portion 214 upwardly extends from the tooth forming portion 215 to the inner circumference forming portion 213. The excess wall portion 214a has a triangular cross section, and the thickness thereof gradually increase from the inner circumference forming portion 213 to the tooth forming portion 215. The lower surface of the excess wall portion 214a smoothly continues to the lower surface of the tooth forming portion 215. The thickness of the inner circumference forming portion 213 is approximately same as the inner circumferential portion 203 after recompressing.

The die set 220 comprises a die 221, a core rod 222, an upper cylindrical punch 223, and a lower cylindrical punch 224. The die has an inner surface 221a into which an outer tooth flank is slidably closely fitted. The core rod 22 is slidably inserted into the shaft hole 212 of the sintered body 211A. The upper and lower punches 223 and 224 push the upper and lower end surfaces of the sintered body 211A and compress it in the thickness direction. The shapes of the upper and lower punches 223 and 224 have sizes and shapes corresponding to those of the upper and lower end surfaces of the sprocket 201A after recompressing.

As shown in FIG. 9, the sintered body 211A is closely surrounded by a die 221 such that the inner circumference forming portion 213 is upwardly projected and the tooth flank is closely fitted into the inner surface 221a and rotation of the sintered body is prevented. In such a setting condition, the sintered body 211A is recompressed by movement of the upper and lower punches 223 and 224 toward the sintered body 211A. The punching surfaces of the upper and lower punches have sizes and shapes corresponding to those of the upper and lower surface of the sprocket 201A after recompressing. Therefore, when the upper and lower punches 223 and 224 are brought into contact with the sintered body 211A, specific plastic flow of the material occurs since the excess wall portions 215a are formed. That is, the excess wall portion 215a is formed on both end surfaces of the tooth forming portion 215, whereby the upper punch 223 is brought into contact with only the upper surface of the excess wall portion 215a of the tooth forming portion 215, and lower punch 224 is brought into contact with only the lower surface of the excess wall portion 215a of the tooth forming portion 215. Thus, a gap is formed between the upper and lower punches 223 and 224 and the step forming portion 214 and the inner circumference forming portion 213.

Figure 10A:
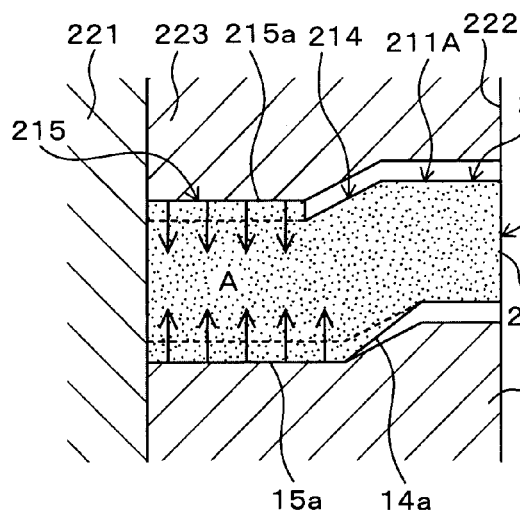
FIGS. 10A to 10D are cross sectional views showing a compressing process in order according to the second embodiment of the invention and FIG. 10E is a cross sectional view showing a density distribution in the sprocket.
Figure 10B:
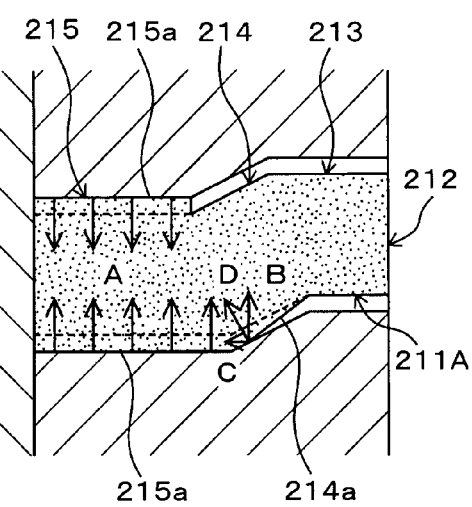
Figure 10C:
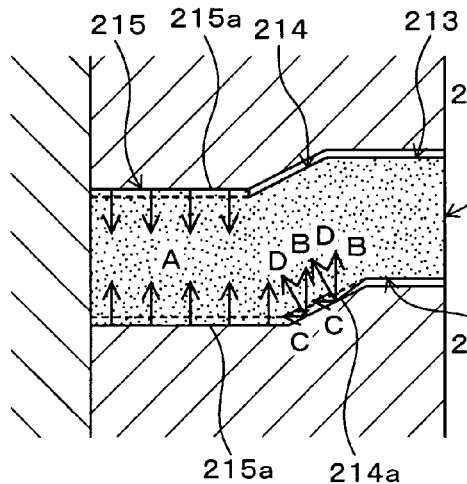
Figure 10D:
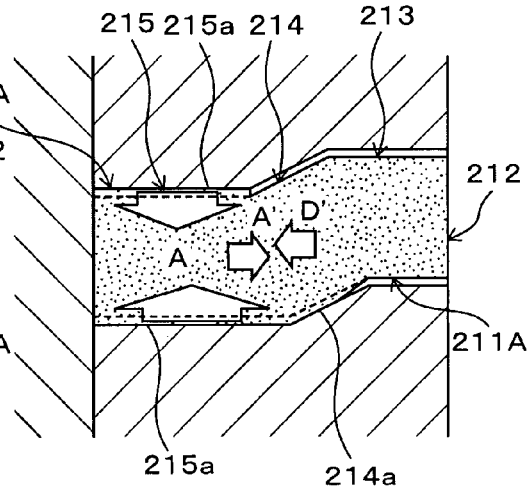

As shown in FIG. 10A, when the upper and lower punches 223 and 224 further moves to each other and compressing is started, the excess wall portions 215a of the tooth portion 215 are first crushed. Furthermore, as shown in FIG. 10B, the excess wall portion 214a of the step forming portion 214 is crushed from radially outer portion by the lower punch 224. Then, as shown in FIGS. 10C and 10D, the excess wall portion 215a of the tooth portion 215 and the excess wall portion 214a of the step forming portion 214 are further crushed. Subsequently, the recompressing of the sintered body is finished when the upper and lower punches 223 and 224 are closely contacted with the entire upper and lower surfaces of the sintered body 211A or the entire sintered body 211A is slightly further compressed from this condition, and the sprocket 201A shown in FIG. 8 is thus obtained.

In the above compressing, when the tooth forming portion 215 is compressed in the thickness direction shown by arrow A as shown in FIGS. 10A to 10B and the excess wall portion 215a is crushed, the material does not plastically flow to the radially outward direction in the tooth forming portion 215 because the tooth flank is closely surrounded by the die 211. In stead, the material flows to the step forming portion 214 opposite to the tooth flank. On the other hand, when the excess wall portion 214a in the step forming portion 214, which is inclined with respect to the tooth forming portion 215, is compressed, specific material flow occurs as shown in FIGS. 10C and 10D. That is, FIG. 10C shows a component force direction D of the compressing direction B and the radially outer direction C perpendicular to the direction B. Thus, the material plastically flows in the direction D in the step forming portion 214.

Figure 10E:
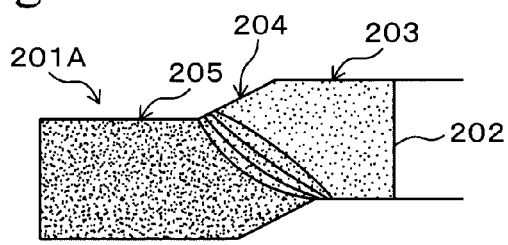

As shown in FIG. 10D, the material flow in the direction D functions as a material flow in the direction D' opposite to the material which flows out from the tooth forming portion 215 to the step forming portion 214 in the direction A. The material flow in direction D' inhibits the material flow from the tooth forming portion 215 to the step forming portion 214. As a result, the tooth forming portion 215 is highly densified, and tooth portion 205 after recompressing is sufficiently densified. FIG. 10E shows an example of a density distribution of the sprocket 201A obtained by the embodiment. A density gradient is formed in a narrow area in the step portion 204 between the high density tooth portion 205 and the low density inner circumferential portion 203, which are clearly distinctive.

Figure 11A:
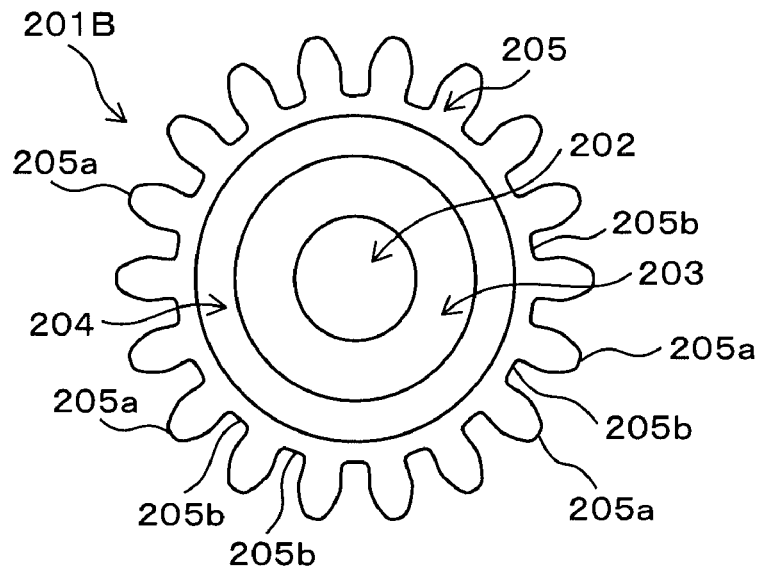
FIG. 11A is a plane view showing another sprocket gear according to the second embodiment of the invention and FIG. 11B is a cross sectional view showing the sprocket.
Figure 11B:
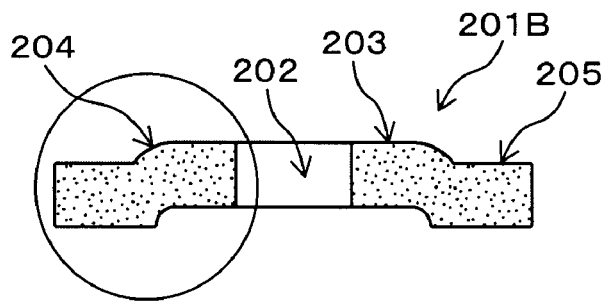
Figure 11C:
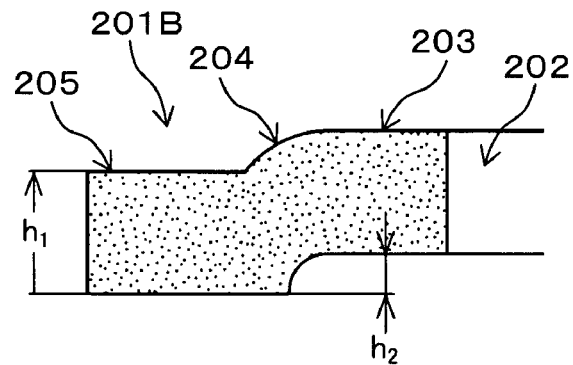
FIG. 11C is enlarged view of the sprocket.
Figure 12:
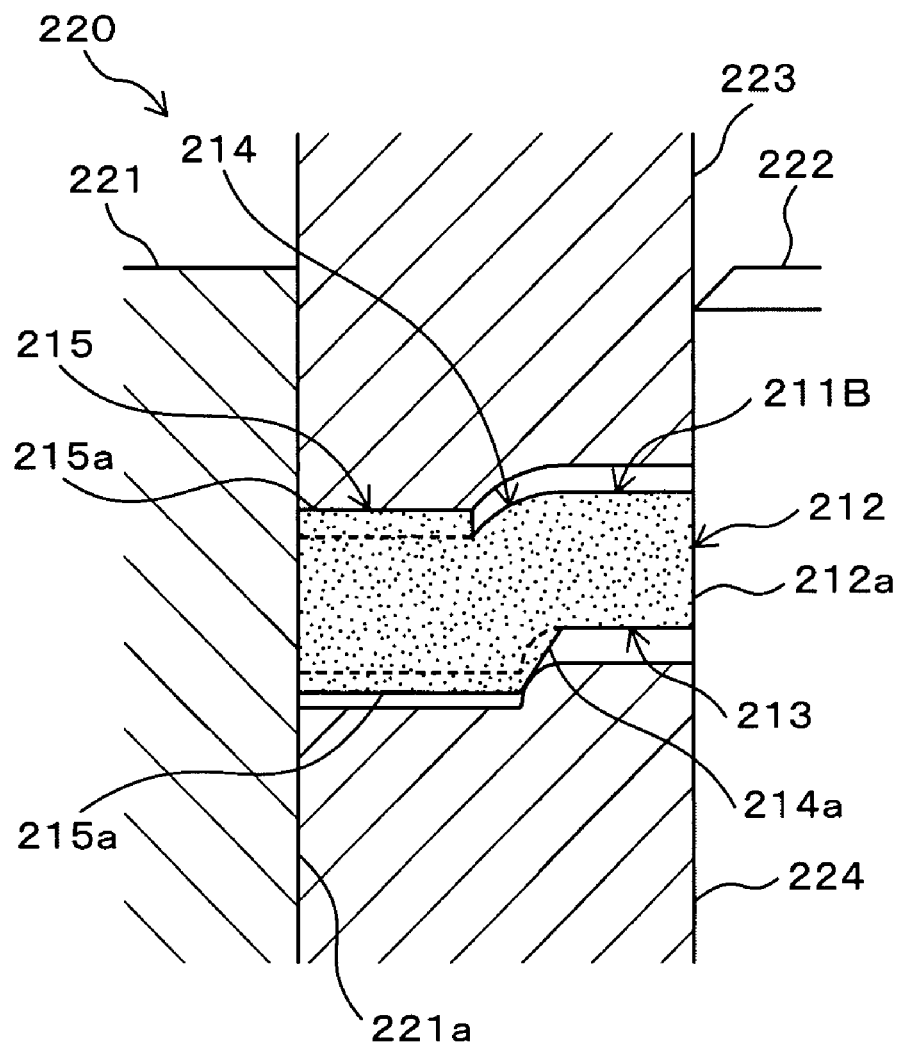
FIG. 12 is a cross sectional view showing a condition in which a sintered body is set in a die according to the third embodiment of the invention.

The shape of the cross section of the step portion 204 in the sprocket 201A is linear. The present invention can be applied to a sprocket 201B having a step portion with an arc shaped cross section as shown in FIG. 11. FIG. 12 shows a sintered body 211B before recompressing for such a sprocket 201B and a die set 220 for recompressing. The sintered body 211B also comprises a tooth forming portion 215, a step forming portion 214, and an inner circumference forming portion 213. An excess wall portion 215a having a uniform thickness is formed on both surface of the tooth forming portion 215. An excess wall portion 214a of which lower surface is linearly inclined is formed on the lower surface of the step forming portion 214. The die 221 and the core rod 222 shown in FIG. 9 are applied to the die set 220. The upper and lower punches 223 and 224 are arranged corresponding to the shapes of both end surfaces of the sprocket 201B, specifically, designed to form the step portion 204. It should be noted that the tooth portion 205 has a thickness h1 and the step portion 204 has a level distance h2 between the tooth portion 205 and the inner circumferential portion 203, and h2/h1 is ¼ or more.

Figure 13A:
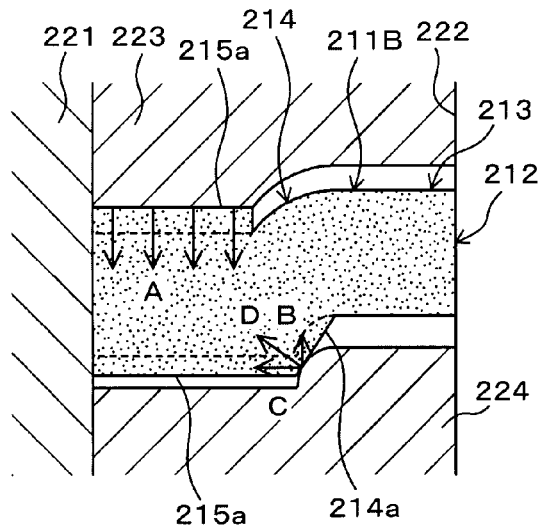
FIGS. 13A to 13C are cross sectional views showing a compressing process in order according to the third embodiment of the invention and FIG. 13D is a cross sectional view showing a density distribution in the sprocket.
Figure 13B:
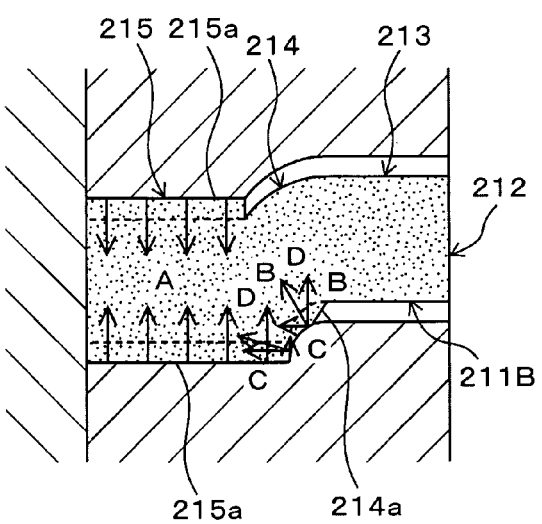
Figure 13C:
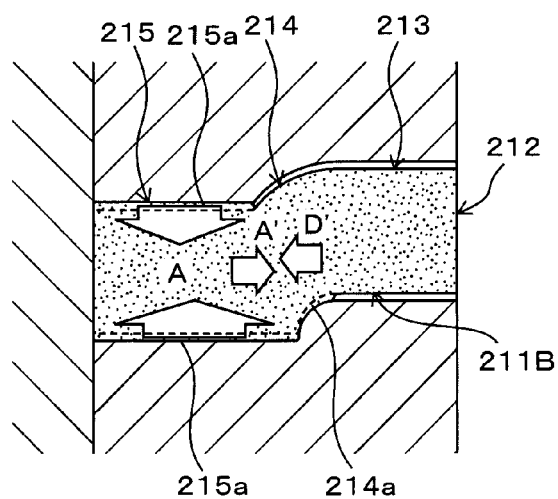

FIGS. 13A to 13C show a condition in which the sintered body 211B is compressed by the upper and lower punches 223 and 224 in the thickness direction. As shown inn FIG. 13A, first, the excess wall portion 215a of the tooth forming portion 215 is compressed by the upper punch 223 and the excess wall portion 214a of the step forming portion 214 is compressed by the lower punch 224. Then, as shown in FIG. 13B, the tooth forming portion 215 is compressed from top and bottom and the excess wall portion 214a of the step forming portion 214 is compressed.

Figure 13D:
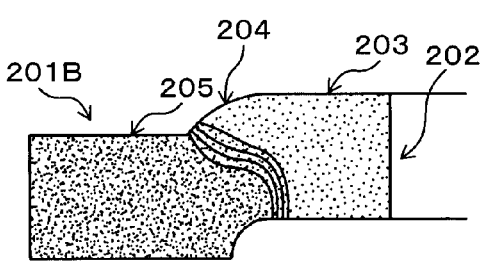
Figure 14A:
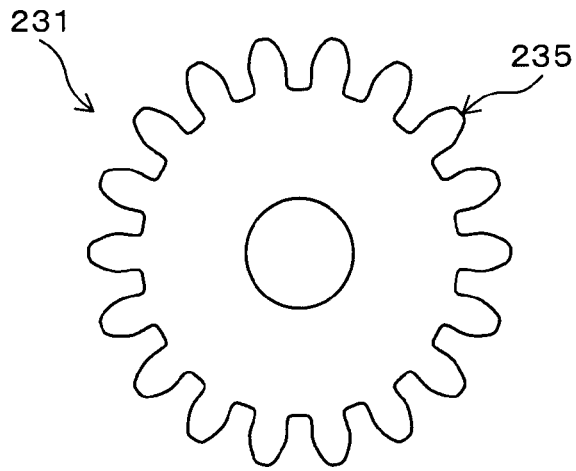
FIG. 14A is a plane view showing a sprocket produced by a conventional method and FIG. 14B is a cross sectional view of the sprocket.
Figure 14B:
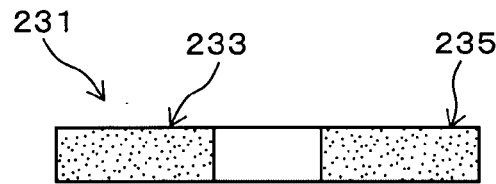
Figure 15:
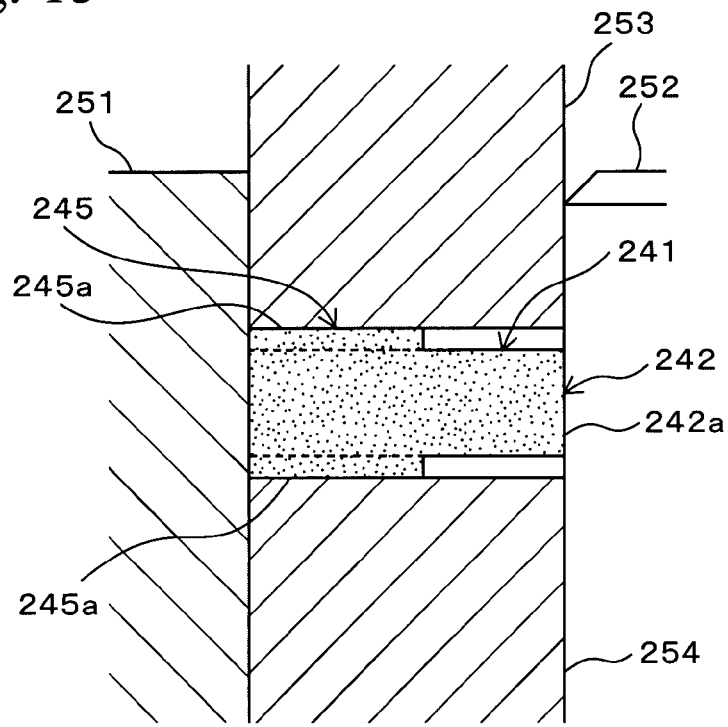
FIG. 15 is a cross sectional view showing a condition in which a sintered body is set in a die.
Figure 16A:
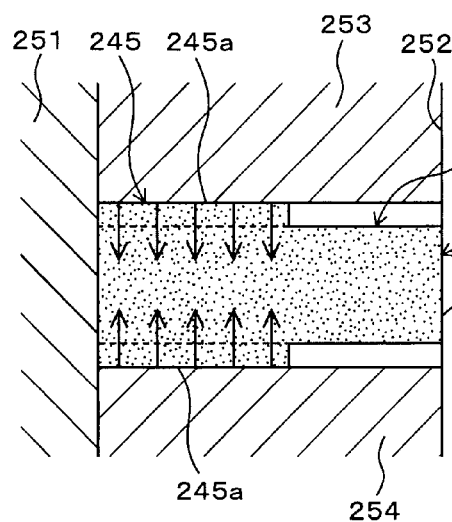
FIGS. 16A to 16C are cross sectional views showing a compressing process in order according to the conventional method and FIG. 16D is a cross sectional view showing a density distribution in the sprocket.
Figure 16B:
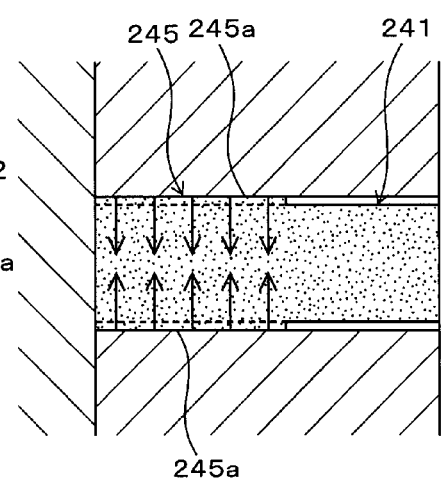
Figure 16C:
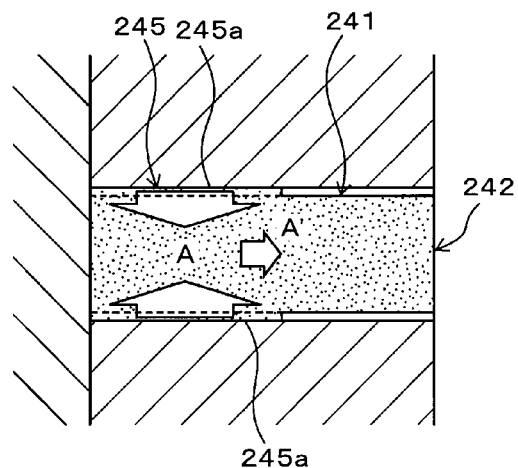
Figure 16D:
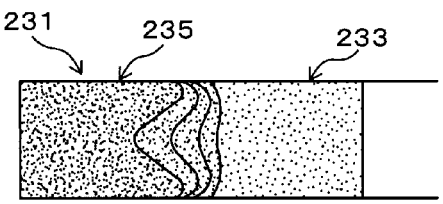

FIGS. 13A and 13B show a component force direction D of the compressing direction B and the radially outer direction C perpendicular to the direction B. Also in this case, the material plastically flows in the direction D in the step forming portion 214. As shown in FIG. 13C, the material flow in the direction D functions as a material flow in the direction D' opposite to the material which flows out from the tooth forming portion 215 to the step forming portion 214 in the direction A. The material flow in direction D' inhibits the material flow from the tooth forming portion 215 to the step forming portion 214. As a result, the tooth forming portion 215 is highly densified, and tooth portion 205 after recompressing is sufficiently densified. FIG. 13D shows an example of a density distribution of the sprocket 201A obtained by the embodiment. A density gradient is formed in a narrow area in the step portion 204 between the high density tooth portion 205 and the low density inner circumferential portion 203, which are clearly distinctive.

The present invention is applied to produce sintered gears with high density area in a required portion such as sprockets, rotors for oil pumps, reduction gears, belt pulley with teeth.

What is claimed is:

1. A production method for a sintered gear rotated around an axis, the sintered gear comprising:
    a tooth portion,
    an inner circumferential portion having a lower density than that of the tooth portion; and
    a step portion connecting the tooth portion and the inner circumferential portion, the method comprising:
    a step for compressing a sintered body in the axial direction, the sintered body comprising:
        a tooth forming portion having tooth excess wall portions extending in first and second axial directions from both ends thereof, the second axial direction being opposite to the first axial direction,
        an inner circumference forming portion and disposed at a position biased from the tooth forming portion toward the first axial direction, and
        a step forming portion connecting the tooth forming portion and the inner circumference forming portion,
        the step forming portion linearly extending to the axis inclining toward the first axial direction in a cross section and having a step excess wall portion at a side of the second axial direction,
    wherein a thickness of the step forming portion gradually increases along the step excess wall portion from the inner circumference forming portion to the tooth forming portion in a cross section,
    wherein in the step for compressing the sintered body, the tooth excess wall portions of the tooth forming portion is crushed and the tooth portion is formed in a condition in which an outer circumferential surface of the sintered body is closely surrounded by a die, and
    at least the step excess wall portion of the step forming portion is compressed thereby crushing the step excess wall portion, flowing the material of the step forming portion toward the tooth forming portion, and forming the step portion between the tooth portion and the inner circumferential portion, and
    obtaining the sintered gear including the tooth portion, the inner circumferential portion projecting in the axial direction and disposed at a position biased from the tooth portion and the inner circumferential portion.

2. The production method for a sintered gear according to claim 1, wherein the tooth portion has a thickness h1 in the compressing direction and the step portion has a level distance h2 between the tooth portion and the inner circumferential portion and h2/h1 is ¼ or more.

3. The production method for a sintered gear according to claim 1, wherein the step portion has a cross section with a linear shape, and the step portion is inclined with respect to the tooth portion with an angle of 10 degrees to less than 90 degrees.

4. The production method for a sintered gear according to claim 1, wherein the step portion has an arc cross section.

* * * * *